United States Patent
Choi

(10) Patent No.: US 7,176,648 B2
(45) Date of Patent: Feb. 13, 2007

(54) ENERGY MANAGEMENT APPARATUS AND METHOD FOR INJECTION MOLDING SYSTEMS

(75) Inventor: Christopher Wai-Ming Choi, Richmond Hill (CA)

(73) Assignee: Husky Injection Molding Systems Ltd. (CA)

( * ) Notice: Subject to any disclaimer, the term of this patent is extended or adjusted under 35 U.S.C. 154(b) by 371 days.

(21) Appl. No.: 10/847,663

(22) Filed: May 18, 2004

(65) Prior Publication Data

US 2005/0258795 A1    Nov. 24, 2005

(51) Int. Cl.
*G05B 11/32* (2006.01)

(52) U.S. Cl. .................. 318/625; 318/370; 318/700; 318/375

(58) Field of Classification Search ........... 318/625, 318/370, 372, 373, 376, 700, 832, 375, 377, 318/106, 109, 382; 187/290, 296; 290/4 R, 290/7

See application file for complete search history.

(56) References Cited

U.S. PATENT DOCUMENTS

| | | | |
|---|---|---|---|
| 4,904,913 A | 2/1990 | Jones et al. | |
| 4,988,273 A | 1/1991 | Faig et al. | |
| 5,052,909 A | 10/1991 | Hertzer et al. | |
| 5,093,052 A | 3/1992 | Wurl et al. | |
| 5,125,469 A | 6/1992 | Scott | |
| 5,362,222 A | 11/1994 | Faig et al. | |
| 5,470,218 A | 11/1995 | Hillman et al. | |
| 5,486,106 A | 1/1996 | Hehl | |
| 5,522,434 A | 6/1996 | Lindblom | |
| 5,580,585 A | 12/1996 | Holzschuh | |
| 5,582,756 A | 12/1996 | Koyama | |
| 5,811,037 A | 9/1998 | Ludwig | |
| 6,034,492 A | 3/2000 | Saito et al. | |
| 6,089,849 A | 7/2000 | Bulgrin et al. | |
| 6,120,277 A | 9/2000 | Klaus | |

(Continued)

OTHER PUBLICATIONS

Joachin Holtz, Methods for Speed Sensorless Control of AC Drives, Published in K. Rajashekara (Editor), IEEE Press Book, 1996, pp. 1-9.

(Continued)

*Primary Examiner*—Karen Masih
(74) *Attorney, Agent, or Firm*—Katten Muchin Rosenman LLP

(57) ABSTRACT

An energy management control apparatus for a molding machine that includes a first electrically-driven prime mover configured to drive at least a first molding machine device, and a second electrically-driven prime mover configured to drive at least a second molding machine device, includes a common DC link configured to provide DC energy to the first electrically-driven prime mover and to the second electrically-driven prime mover. A slave axis is configured to supply and absorb energy from to/from the common DC link. A machine controller is configured to (i) communicate with the first electrically-driven prime mover, the second electrically-driven prime mover, the common DC link, and the slave axis, (ii) cause the slave axis to supply energy to the common DC link in response to input from at least one of the first electrically-driven prime mover and the second electrically-driven prime mover, and (iii) cause the slave axis to absorb energy from the common DC link in response to input from at least one of the first electrically-driven prime mover and the second electrically-driven prime mover.

59 Claims, 5 Drawing Sheets

U.S. PATENT DOCUMENTS

| | | |
|---|---|---|
| 6,272,398 B1 | 8/2001 | Osborne et al. |
| 6,275,741 B1 | 8/2001 | Choi |
| 6,278,915 B1 * | 8/2001 | Deguchi et al. ............... 701/22 |
| 6,289,259 B1 | 9/2001 | Choi et al. |
| 6,299,427 B1 | 10/2001 | Bulgrin et al. |
| 6,333,611 B1 | 12/2001 | Shibuya et al. |
| 6,379,119 B1 | 4/2002 | Truninger |
| 6,611,126 B2 | 8/2003 | Mizuno |
| 6,647,719 B2 | 11/2003 | Truninger |
| 6,742,630 B2 * | 6/2004 | Eilinger ...................... 187/290 |
| 2002/0062183 A1 * | 5/2002 | Yamaguchi et al. .......... 701/22 |
| 2003/0089557 A1 | 5/2003 | Eilinger |

OTHER PUBLICATIONS

Azzedoine Ferrah, Keith J. Bradley, Philippa J. Hogben-Laing, Malcolm S. Woolfson, Greg M. Asher, Mark Sumner, Joseph Cilia, Jiao Shuli, A Speed Identifier for Induction Motor Drives Using Real-Time Adaptive Digital Filtering, IEEE Transactions on Industry Applications, vol. 34, No. 1, Jan./Feb. 1998, pp. 156-162.

* cited by examiner

ENERGY MANAGEMENT APPARATUS AND METHOD FOR INJECTION MOLDING SYSTEMS

BACKGROUND OF THE INVENTION

1. Field of the Invention

The present invention relates to an injection molding system and, more particularly, to: the energy management of a hybrid injection molding system that comprises (i) an electrically driven prime mover of a hydraulic pumping assembly and (ii) a plurality of hydraulic and/or electric driven actuators (such as parts handling robots, extruders, injection units, mold stroke, and clamping units, and the like); and to the energy management of an all-electric injection molding machine system that comprises a plurality of electric driven actuators (such as parts handling robots, extruders, injection units, mold stroke and clamping units, and the like).

2. Description of Related Art

Actuators and of conventional injection molding machines typically use a hydraulic power source. It is well known that hydraulic systems are not energy efficient. This is primarily due to its inherent volumetric losses and torque losses. Volumetric losses include laminar leakage losses, turbulent leakage losses, and losses due to fluid compressibility. Torque losses include losses due to fluid viscosity and mechanical friction.

Electro-hydraulic drives and controls are based on two main operating principles: (i) valve control, by changing the resistance to flow in the conductive part, and (ii) pump control, by changing the volume flow in the generative part of a hydraulic power system. Valve-controlled drives regulate the energy flow by dissipating the excess energy. This is not energy efficient but can achieve quicker responses and better controllability, which are required by a high performance injection molding machine.

In a pump-controlled drive, the energy flow is regulated in accordance with the demand. It accomplishes control by changing the swivel angle of a variable displacement pump, or the speed of a fixed displacement pump, or the speed and the swivel angle of a variable displacement pump. Both speed dependent losses and noise emissions can be considerably reduced by applying speed controlled fixed displacement pumps. The pump/motor efficiency depends on variables such as displacement, pressure difference, and rotational speed. When a variable displacement pump is operating at small displacements, both the laminar leakage and torque losses are relatively large, thus reducing the pump/motor efficiency. In actuation systems using adjustable speed prime mover driving variable displacement pumps, the hydraulic states (namely volume, flow, and pressure) can be controlled as usual through the adjustment of the swivel angle of the pump together with the adjustment of the drive speed. This two-degree-of-freedom regulation helps to improve the pump/motor efficiency at small displacements while minimizing the supply of energy to an injection molding machine.

More recently, cost reduction and improved reliability of power electronics have made actuators driven by servo electric motors more practical for injection molding machines. A Voltage Source Inverter (VSI) is one such drive. A VSI drive includes a converter converting the AC power to DC source, a voltage controlled DC link smoothing the rectified DC voltage with a capacitor and an optional inductor, and an inverter with control generator supplying regulated power to control a motor. Injection molding machines using solely electric motors as propulsion means are commonly called all-electric machines. Injection molding machines using both hydraulics and servo electric motors as propulsion means are commonly called hybrid injection molding machines.

In a conventional hydraulic injection molding machine, the number of poles and the supply frequency of its prime mover (often an Induction Motor (IM)) are fixed. As a result, the hydraulic pumps are driven at a constant speed, even though the demand varies considerably during the cycle. When flow demand is reduced, the excess flow rate is bypassed to the accumulator tank by a relief valve. One way of meeting the varying demands is to fit an Adjustable Speed Drive (ASD) to the motor. An ASD allows the speed of an AC motor to be varied and the pump output can therefore be matched to the variable demand. The benefits of the ASD are: reduction in energy costs by matching the output to the need, reduction in noise by running the motor and pump at lower speeds, reduction in throttle and bypass losses, and a reduction in the oil cooling cost.

One control strategy is based on matching the demands of each machine operation phase, such as those disclosed in U.S. Pat. No. 5,052,909. The machine controller controls the pump motor to change the speed at each point of the process. The more closely the controller commands the right speed to match the actual requirements at each point of the process, the more energy is saved. However, there are drawbacks to this approach. When the drive accelerates and decelerates slowly, the speed to produce the desired flow must be commanded well before the flow is needed in order to deliver the right amount of flow when it is demanded. The extra flow produced during the time of such acceleration does not produce useful work, since the machine is not yet ready to receive the flow. The same happens on deceleration. Deceleration to a new lower flow can only commence when the higher flow is not needed. If the drive cannot slow down very quickly, the extra flow is also wasted. Even if the motor can accelerate and decelerate rapidly, for a prime mover with high inertia, significant kinetic energy that is stored during acceleration is often wasted during deceleration. Therefore, merely using an ASD to change the speed of the pump motor for matching the variable demands is not the most effective way to improve the energy efficiency.

During deceleration, the electric motor acts as a generator and energy is fed back to the drive, which if not managed, may raise the voltage of a DC link to an unacceptable level that renders the drive inoperative. Known systems use braking resistors and chopping circuits to dissipate regenerative energy. This energy is dissipated in the form of heat and cannot be reused. In other known systems, regenerative units in the form of Active Front End (AFE) are used to invert the regenerative energy to AC power and feed this back to the supply system. AFE provides bi-directional energy exchange between the supply and the inverter, and it generates lower harmonics than a diode bridge rectifier. However, it requires that the DC bus voltage to be greater than the peak of the AC input voltage; otherwise the sinusoidal wave shape of the output current cannot be maintained.

To be effective, ASD with AFE operates generally at a higher DC link voltage than ASD with diode bridge rectifier; it results in higher rates of voltage change at the motor terminals. AFE adds an extra set of Insulated Gate Bipolar Transistors (IGBT) inverters to the ASD and it has twice the cost of diode bridge rectifier; and it causes the ASD to generate a net increase of Electro-Magnetic Interference (EMI), unless filtering measures such as adding an isolation transformer and/or inductors are taken. From a machine manufacturer's perspective, it is advantageous to supply customers with cost effective equipment. Together with their enabling accessories, solutions using either braking resistors or AFE all add cost to the system and may not be justified or desirable for all applications. It is apparent that management of these regenerative energies for the safety of the system and capturing them for reuse are the challenges which both all-electric and hybrid injection molding machines have to face. Therefore, more economical and effective means to achieve higher energy efficiency for an injection molding system are needed.

The power demand during an injection molding cycle is not constant and the average power requirement is substantially less than the peak demands. The machine designer often takes advantage of such a power requirement pattern by installing an energy storage device, such as an accumulator, to reduce the installed power. When properly sized, the energy storage devices are charged with energy, during the low power demand operations, of the machine cycle. When high power demand is required, the energy storage devices supply energy in addition to the installed power devices. In this way, the installed power can be reduced. Several known systems use electrical energy storage devices with charging and discharging means connected to the DC link of an electric drive to accumulate the regenerated energy for future use.

Electro-chemical batteries and electrolytic capacitors are the state of the art electrical energy storage devices commonly used for such a purpose. Batteries that store energy in electro-chemical cells are subject to several limitations. One such limitation is the service life, which is the number of charge and discharge cycles possible for a given cell. Another limitation is the depth of discharge, which is that fraction of the stored energy that can be withdrawn. Further, the ambient temperature and the proper charging current must be monitored and kept within limits. The depleted materials may be hazardous and require additional cost for their disposal.

Electrolytic capacitors used as energy storage devices also have several drawbacks in the areas of size, weight, cost, and reliability. Specifically, reliability is a major concern. Due to continuous out-gassing, the electrolytic capacitors deteriorate gradually over time, and this is normally the prime factor of degradation of the system reliability, and consequently they limit the service life of a drive system. In injection molding cycles where cycle time is short and peak demands are high (such as the molding of thin wall parts), a large energy storage device is needed. However, the service life of large electrolytic capacitors and batteries is short and is limited by frequent withdrawal of peak energy. Therefore, electrolytic capacitors are not preferred for use in injection molding applications.

A hydraulic accumulator, as an energy storage device, has the ability to accept high frequencies and high rates of charging and discharging, both of which are not available from electro-chemical batteries and electrolytic capacitors. Typical average efficiency of a hydraulic accumulator is 95–97%. Use of hydraulic accumulator, as energy storage device in injection molding machine, is well known. However, applying it to capture regenerated electrical energy in hybrid injection molding machines is novel. This is partly due to the lack of simple conversion means and transfer means to convert and divert the regenerated electrical energy to a hydraulic accumulator. Even should such means exist, there is no control means in any injection molding system to manage the exchange and regulation of energies in a safe, effective and efficient manner. Therefore, new solutions are needed. This invention discloses new methods and means to solve these problems.

U.S. Patent Publication No. 2003/0089557A1 to Ellinger describes a system for operating elevators that uses a super capacitor to store energy. The application does not teach a method of power balancing at the common DC link nor how the disclosure may relate to injection molding equipment.

U.S. Pat. No. 6,611,126 to Mizuno describes the use of an electrical charger, capable of storing and supplying electrical power to a motor, connecting to the same DC link as the inverter that controls the same motor. The patent does not discuss the use of hydraulic accumulator to store regenerated energy during the deceleration of electric axes. The patent provides no teaching regarding a method of power balancing at the common DC link.

U.S. Pat. No. 6,647,719 to Truninger describes an electrical power control system for machines. An electric motor drives a pump that supplies pressurized oil to a hydraulic circuit that includes actuators and accumulators such that the system acts like an oscillator. The patent provides no teaching regarding a method of power balancing at the common DC link.

U.S. Pat. No. 6,379,119 to Truninger describes an open hydraulic circuit with a vertical load referenced that is supplied by a pump driven by an adjustable speed electric motor. The patent provides no teaching regarding a method of power balancing at the common DC link.

U.S. Pat. No. 6,333,611 to Shibuya describes the use of an electricity accumulation means to accumulate electrical energy regenerated from a motor to build up an electricity accumulation voltage higher than a drive voltage of the same motor, and to supply such electrical energy accumulated to the same motor during an acceleration period of the same motor. The patent does not discuss the management of a common DC link, supplying a plurality of electric servo axes, and it does not discuss the use of hydraulic accumulator to store regenerated energy during the deceleration of electric axes.

U.S. Pat. No. 6,299,427 to Bulgrin describes controls for adjustable speed motor driven pumps. According to the patent disclosure, each motor/pump, driving an axis of an injection molding machine, is independently controlled to match cycle requirements. The patent does not discuss the advantages of using hydraulic energy storage means and it does not discuss the management of a common DC link to improve energy efficiency of an injection molding machine.

U.S. Pat. No. 6,289,259 to Choi describes means for controlling a hydraulic actuator in an injection molding machine. A microcontroller is disposed adjacent the actuator and electrically coupled to a system control processor. The patent provides no teaching regarding a method of power balancing at the common DC link. The microcontroller simply controls the operation of the actuator in response to signals it receives from a suitably located sensor.

U.S. Pat. No. 6,275,741 to Choi describes a means for controlling the operation of an injection molding system that includes a general-purpose computer that is coupled to an operator control panel and a plurality of injection molding devices and functions. The computer is thus able to perform multi-tasking control of both the injection molding and operator control functions. The patent does not discuss power management.

U.S. Pat. No. 6,272,398 to Osborne describes a process control system for an injection molding machine that includes a first computer having a processor for controlling the molding process and a second computer having an application-specific program which allows the operator to view parameters related to the process. The patent is not concerned with power management.

U.S. Pat. No. 6,120,277 to Klaus describes an adjustable speed motor to drive either a screw in an injection molding machine or a hydraulic pump to charge an accumulator. The patent provides no teaching regarding a method of power balancing at the common DC link.

U.S. Pat. No. 6,089,849 to Bulgrin describes controls for adjustable speed motor driven pumps. The patent provides no teaching regarding a method of power balancing at the common DC link.

U.S. Pat. No. 6,034,492 to Saito describes a DC motor-generator and capacitor combination. The DC motor-generator rotates to provide electric energy to the capacitor for storage. The stored electrical energy provides an emergency power source. The patent describes a very rudimentary form of a power management system. The patent provides no teaching regarding a method of power balancing at the common DC link.

U.S. Pat. No. 5,811,037 to Ludwig describes switching off the electric drive if the length of the cooling time in the molding cycle is longer than a predetermined time. The patent provides no teaching regarding a method of power balancing at the common DC link.

U.S. Pat. No. 5,582,756 to Koyama describes the use of a DC source from a servo drive to control a heater in an injection molding machine. The patent does not discuss the use of the heater to reuse the energy regenerated during deceleration of the motor controlled by an inverter, nor managing the balance of power at a common DC link.

U.S. Pat. No. 5,580,585 to Holzschuh describes an adjustable speed motor driven pump that supplies various actuators; however, an accumulator is not shown. The patent provides no teaching regarding a method of power balancing at the common DC link.

U.S. Pat. No. 5,522,434 to Lindblom describes a very large weaving machine that is driven by a drive unit that includes a direct-current operated unit. The DC unit operates as a motor or a generator depending upon whether the drive is accelerating or decelerating. When decelerating, the electrical energy is fed back to the power supply network. The control unit for the drive unit can be a microcomputer or a personal computer unit. The patent discloses a power management system where the excess energy generated during deceleration of the drive unit is recaptured as electrical energy. This patent discloses the use of two DC motors, which can be converted as generators to recover wasted energy as electrical energy. The patent provides no teaching regarding a method of power balancing at the common DC link.

U.S. Pat. No. 5,486,106 to Hehl describes a variable capacity pump operated to maintain a constant operational pressure gradient driven by a rotary current motor connected to an adjustable frequency converter to control its speed. The patent provides no teaching regarding a method of power balancing at the common DC link.

U.S. Pat. No. 5,470,218 to Hillman describes injection blow molding apparatus that includes a plurality of injection blow molding machines each having a plurality of injection molds and blow molds. A process controller is coupled to each machine and a master processor is coupled to each of the controllers. The patent does not describe any mechanism for power management.

U.S. Pat. No. 5,362,222 to Faig describes an all-electric injection molding machine that uses vector controlled AC induction motors in its servomechanism drive systems. The vector controller means of each drive means shares a common CPU that provides pulse width modulated trigger signals, multiplexed through a switch bank in the form of either mechanical or solid state switches, to a power module of the power amplifier associated with each AC motor, one at a time. The use of either mechanical or solid state switches may prevent the simultaneous control of all servo axes in real-time. The '222 patent, however, does not provide an arrangement for retrieving nor re-using any excess power regenerated by the machine process, nor managing the balance of power at a common DC link. In addition, the vector controlled AC induction motor in '222 patent requires a sensor such as an encoder or speed sensor for detecting the angular position of the rotor of the AC induction motor. In contrast thereto, sensorless techniques having the same torque dynamics as sensored drive are well known. See, for example: J. Holtz, "Methods for speed sensorless control of AC Drives," in Proc. IEEE IECON'93, Yokohama, Japan, 1993, pp. 415–420; A. Ferrah, K. J. Bradley, P. Hogben-Laing, M. Woolfson, G. Asher, and M. Summer, "A speed identifier for induction motor drives using real-time adaptive digital filtering," IEEE Trans. Ind. Applicat. Vol 34, pp. 156–162, January/February 1998. Further, induction motor controlled by controller using direct torque control method, rather than vector control method, can provide the same functions and performances as disclosed in '222. See, for example: "Technical Guide No. 1—Direct Torque Control", ABB Industry Oy, 3BFE 58056685 R0125 REV B, EN 30.6.1999.

U.S. Pat. No. 5,125,469 to Scott describes a system for storing deceleration energy from a motor vehicle and for using the stored deceleration energy to assist in accelerating the motor vehicle. The patent is useful for showing another application of a power recovery system. The patent provides no teaching regarding a method of power balancing at the common DC link.

U.S. Pat. No. 5,093,052 to Würl describes an adjustable speed drive for an electrically driven pump. The patent provides no teaching regarding a method of power balancing at the common DC link.

U.S. Pat. No. 5,052,909 to Hertzer describes a hydraulic injection molding machine that uses a variable speed motor to drive the pump. The operating signals of the variable speed motor are generated by the machine controller, in accordance with one of a plurality of stored values, calculated according to the hydraulic fluid output required of a particular phase of operation of the machine. The patent does not provide an arrangement for using accumulator means to recapture any excess power generated by the machine process, and it does not provide any means to charge the accumulator to improve energy efficiency. The patent provides no teaching regarding a method of power balancing at the common DC link.

U.S. Pat. No. 4,988,273 to Faig describes an all-electric injection molding machine that uses brushless DC motors in its servomechanism drive systems. The patent provides no teaching regarding a method of power balancing at the common DC link.

U.S. Pat. No. 4,904,913 to Jones describes a motor control system that includes a phase inverter for sensing the individual steps of the molding machine, producing a time stream of voltage levels, each of which are representative of the least amount of power required by the molding machine during its operational steps, and varying the speed of the motor in response to such voltage levels during each operation step so as to reduce the electrical power required by the machine during its cycle. The patent provides no teaching regarding a method of power balancing at the common DC link.

SUMMARY OF THE INVENTION

It is an object of the present invention to provide an energy management system for an injection molding system that overcomes the problems noted above. It is also an object of the present invention to provide an energy management system for an injection molding system that controls operations and processes energy so that actual use results in a higher system energy efficiency and functional performance, while keeping the cost of system inexpensive.

Two important control strategies may be used in high performance motor control schemes. One is the theory of Field Oriented Control (FOC), also commonly known as Vector Control, developed by Hasse and Blaschke in the early 1970's. See F. Blaschke, "The principle of field orientation as applied to the new Transvektor closed loop control system for rotating field machines", Siemens Review, Vol. 34, 1972, pp. 217–220. FOC can be classified as direct, indirect, or sensorless. Direct FOC measures the rotor angle directly, with sensors located in the motor housing. Indirect FOC measures the speed, for instance, using resolvers or tachometers, and then determines the slip angle by integrating the speed. Unlike direct FOC and indirect FOC, sensorless FOC performs all measurements and calculations on the stator variables of the motor. The other important control strategy that may be used in high performance motor control schemes is the Direct Torque Control (DTC), developed by Takahaski and Dependbrock in the mid of 1980's. See, for example: Takahashi Isao, Noguchi Toshihiko: "A New Quick-Response and High-Efficiency Control Strategy of an Induction Motor" IEEE Transactions on Industry Applications, Vol. IA-22, No. 5, September/October 1986; M. Depenbrock: "Direct Self-Control (DSC) of Inverter-Fed Induction Machine", IEEE Transactions on Power Electronics, Vol. 3, No. 4, October 1988; and "Technical Guide No. 1—Direct Torque Control", ABB Industry Oy, 3BFE 58056685 R0125 REV B, EN 30.6.1999. DTC drive normally operates very well as a sensorless drive, i.e. without the need for a feedback device such as an encoder or a tachometer. When the rotor's speed or position is provided as feedback to a DTC drive, its static and dynamic performances can match those of any other servo drives. DTC also provides excellent torque control but has not been commonly used in injection molding machines. ASD's controlled by either FOC or DTC can be used to achieve the advantages according to the present invention. With advances in digital computers, these control strategies and their subsequent enhancements can now be realized in industrial applications. They enable the use of motors of simpler construction for sophisticated applications, once dominated by higher cost Permanent Magnet Synchronous Motors (PMSM). Induction motors (IM) that were used primarily for fixed-speed applications can be equipped with cost effective ASD to satisfy variable speed applications. Control issues with respect to Switched Reluctance Motor (SRM) can be solved by sophisticated digital power electronic controls. SRM's can now perform as well as IM's but are much cheaper and more robust than IM's. IM's, SRM's, and PMSM's may be used to achieve the advantages of the present invention.

Typical hybrid and all-electric injection molding systems usually have several motors installed in a single system, with each motor equipped with an individual drive, each drive having its own converter, DC link, and inverter. According to one aspect of the present invention, structure and/or steps are provided whereby a hybrid or an all-electric injection molding system comprises a common DC link configuration with one converter supplying several inverters. This reduces the number of system components, thereby increasing the system's reliability. Preferably, operating ASD's in a common DC link architecture contributes to the reduction of system cost and a reduction in cabinet space. When multiple drives of a hybrid or an all-electric injection molding machine share a common DC link, kinetic energies stored in the inertias are preferably regenerated to the DC link for power sharing. In the event of voltage sag, high inertia drives are preferably put into braking mode, regenerating energy, to keep the DC link voltage up. Preferably, the present invention further includes drives having either FOC or DTC as their control methods. With an FOC or DTC controlled motor, the transition from motoring to generating and vice versa, can be accomplished within a few milliseconds. Regenerated energy can then be used to feed other drives on the same DC bus and reduce the intake of energy from the supply. Similarly, a high surge of regenerated energy, due to rapid deceleration of high inertia loads, can be removed from the DC bus by accelerating non-critical loads.

It is an advantage of the present invention to be able to reduce the process demands by the machine controller, by either changing process steps to reduce overlapping motions or lowering the speed profiles, to ensure the installed power is not exceeded. This is a novel feature which will enable a series of products with identical functionalities but different levels of performances, according to the installed power (compared to autos with V6 or V8 engines). The advantages of the present invention will also enable the use of extruder heaters to absorb the regenerative energy during screw deceleration. This makes sense because, during the screw deceleration, the heating power to the resin produced by the screw is reduced and regenerative power by the screw can be re-used by the heaters to maintain a uniform heating power to the melted resin.

It is another advantage of the present invention to be able to eliminate those braking resistors, which are installed for the sole purpose of dissipating the regenerated power during rapid deceleration of an electric motor driven actuator. It is another advantage of the present invention to be able to achieve a lean supply to the hybrid injection molding system by limiting the supply of excess energy, which cannot be used to perform useful work. It is another advantage of the present invention to be able to re-use regenerated power to perform useful work.

It is a further advantage of the present invention to be able to improve energy efficiency and functional performance while keeping the cost of the system low.

The above-described advantages, in addition to other advantageous features of this invention, are achieved in another aspect of the present invention by a hybrid injection molding system including a machine controller having structure configured to communicate in real-time with the system's sensors, transducers, actuators, and distributed controllers, to receive signals and measurements from the system and to use such information together with preprogrammed control software to generate command signals and information in real-time to the system and to the system control operations and processes. A common DC link provides DC power to inverters for controlling power to and from at least two electrical motors controlled by adjustable speed drives. A high speed bi-directional communication fieldbus is configured to be capable of communicating to and from all drive controllers and the machine controller. A slave axis is configured to be capable of supplying and absorbing power from the common DC link. A torque controller is configured to be capable of controlling the slave axis in (i) normal speed control and (ii) DC link voltage control, and switching control between the said two controls in a bumpless transfer manner. An electrically driven prime mover of a hydraulic pumping assembly is configured to be capable of regulating the flow rate and the power of the hydraulic fluid supply via the hydraulic driven actuation structure. An energy accumulation means is operable to store and release energy through receipt and release of hydraulic fluid.

The above-described advantages, in addition to other advantageous features of this invention, may also achieved in yet another aspect of the present invention by an all-electric injection molding system including a machine controller having configured to communicate in real-time with the system's sensors, transducers, actuators, and distributed controllers, for receiving signals and measurements from the system and to use such information together with preprogrammed control software to generate command signals and information in real-time to the system and the system control operations and processes. A common DC link is configured to provide DC power source to inverters for controlling power to and from at least two electrical motors controlled by adjustable speed drives. A high speed bi-directional communication fieldbus is configured to be capable of communicating to and from all drive controllers and the machine controller. A slave axis is configured to be capable of supplying and absorbing power from the common DC link. A torque controller is configured to be capable of controlling the slave axis in (i) normal speed control and (ii) DC link voltage control, and switching control between the two controls in a bumpless transfer manner. An electrically driven high speed motor drives a mechanical flywheel and is capable of regulating the speed of the mechanical flywheel energy accumulation structure is configured to store and release energy through the regulation of the speed of the mechanical flywheel.

According to a yet another aspect of the present invention, a unique combination of structure and/or steps are provided for an injection molding machine energy management control apparatus including a first electrically-driven prime mover configured to drive at least a first molding machine device, and a second electrically-driven prime mover configured to drive at least a second molding machine device. A common DC link is configured to provide DC energy to the first electrically-driven prime mover and to the second electrically-driven prime mover. A slave axis is configured to supply and absorb energy to/from the common DC link. A machine controller is configured to (i) communicate with the first electrically-driven prime mover, the second electrically-driven prime mover, the common DC link, and the slave axis, (ii) cause the slave axis to supply energy to the common DC link in response to input from at least one of the first electrically-driven prime mover and the second electrically-driven prime mover, and (iii) cause the slave axis to absorb energy from the common DC link in response to input from at least one of the first electrically-driven prime mover and the second electrically-driven prime mover.

According to a further aspect of the present invention, a unique combination of structure and/or steps are provided for an energy management apparatus for a molding machine having (i) a first motor configured to drive a first molding machine device, and (ii) a second motor configured to drive a second molding machine device. An electrical link is coupled to the first motor and to the second motor. Energy storage structure is configured to (i) store excess energy from at least one of the first motor and the second motor, and (ii) provide stored excess energy to at least one of the first molding machine device and the second molding machine device. Processing structure is configured to cause (i) excess energy from the first motor to be stored in the energy storage structure, and (ii) excess energy stored in the energy storage structure to be used to drive at least the first molding machine device.

According to yet another aspect of the present invention, a unique combination of structure and/or steps are provided for an injection molding machine having a mold, a mold clamp having a mold clamp actuator, and a mold screw having a mold screw actuator. An electrical link couples the mold clamp actuator and said mold screw actuator. An energy accumulator is coupled to at least one of the mold clamp actuator and the mold screw actuator. Energy management processing structure is configured to cause (i) excess energy from at least one of the mold clamp actuator and the mold screw actuator to be stored in the energy accumulator, and (ii) energy stored in the energy accumulator to be provided to at least one of the mold clamp actuator and the mold screw actuator.

According to another aspect of the present invention, a unique combination of steps are provided for a method for managing energy in a molding machine having a first actuator for driving a fist molding device and a second actuator for driving a second molding device. The combination of steps includes: (i) receiving from the first actuator an input signal corresponding to the energy status of the first actuator; (ii) receiving from the second actuator an input signal corresponding to the energy status of the second actuator; (iii) calculating an excess energy condition of any of the first actuator and the second actuator based on the received input signals; (iv) calculating an insufficient energy condition of any of the first actuator and the second actuator based on the received input signals; (v) based on the calculation, providing excess energy from at least one of the first actuator and the second actuator to an energy accumulation device; and (vi) based on the calculation, providing excess energy from the energy accumulation device to at least one of the first actuator and the second actuator.

BRIEF DESCRIPTION OF THE DRAWINGS

Exemplary embodiments of the presently preferred features of the present invention will now be described with reference to the accompanying drawings. The attached drawings show block diagrams of the functional subsystems. Control signals and components in the drawings have been numbered for ease of understanding. These numbers will be referred to throughout this disclosure.

DETAILED DESCRIPTION OF THE PRESENTLY PREFERRED EXEMPLARY EMBODIMENTS

1. Introduction

The present invention will now be described with respect to several embodiments in which injection molding system actuators are controlled with processing structure, a common DC link, and energy management structure. However, the present invention may find use in other applications such as product handling robots, packaging machines, die-casting machines, metal injection machines, automation equipment, and blow molding machines, where a plurality of electric servo driven actuators are used.

2. Voltage Source Inverter Drive

Figure 1:
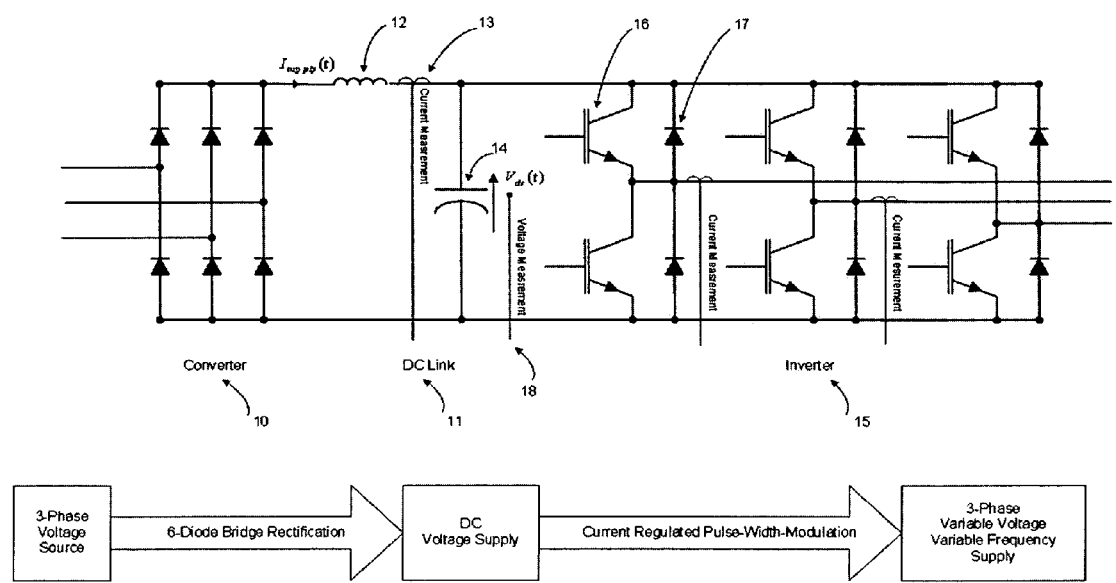
FIG. 1 is a schematic diagram of a known voltage source inverter drive (VSI).

FIG. 1 shows the main functional parts of a typical VSI drive unit. The VSI takes three-phase power at fixed voltage and frequency, provided from a utility, and converts it to three-phase power at the desired variable voltages and frequencies for use in an adjustable speed electric motor. The unit has three main functional sections. A converter 10 takes the three-phase supply power and, by means of its full wave six-diode bridge, rectifies it to a single-phase DC output voltage. Since the rectification is unregulated, the output voltage has high ripple contents (300 to 360 Hz, corresponding to AC supply of 50 to 60 Hz).

The second section comprises a DC link 11 that includes a choke 12, and a capacitor 14 to perform the function of smoothing the ripples of the DC voltage to an acceptable level. The choke 12 helps buffer the capacitor 14 from the AC supply and serves to reduce harmonics. When a load is applied to the DC link 11, the capacitor 14 will begin to discharge. The DC link 11 only draws current through the diodes of the converter 10 from the supply when the line voltage is greater than the DC link voltage. This occurs at or near the peak of the supply voltage resulting in a pulse of current that occurs every input cycle around the peak of the supply voltage. As the load is applied to the DC link 11, the capacitor 14 discharges and DC voltage drops. A lower DC voltage results in a longer duration of higher supply voltage than the DC link voltage. Thus, the width of the pulse of current or the amount of power transferred is determined in part by the load on the DC link 11.

Figure 2:
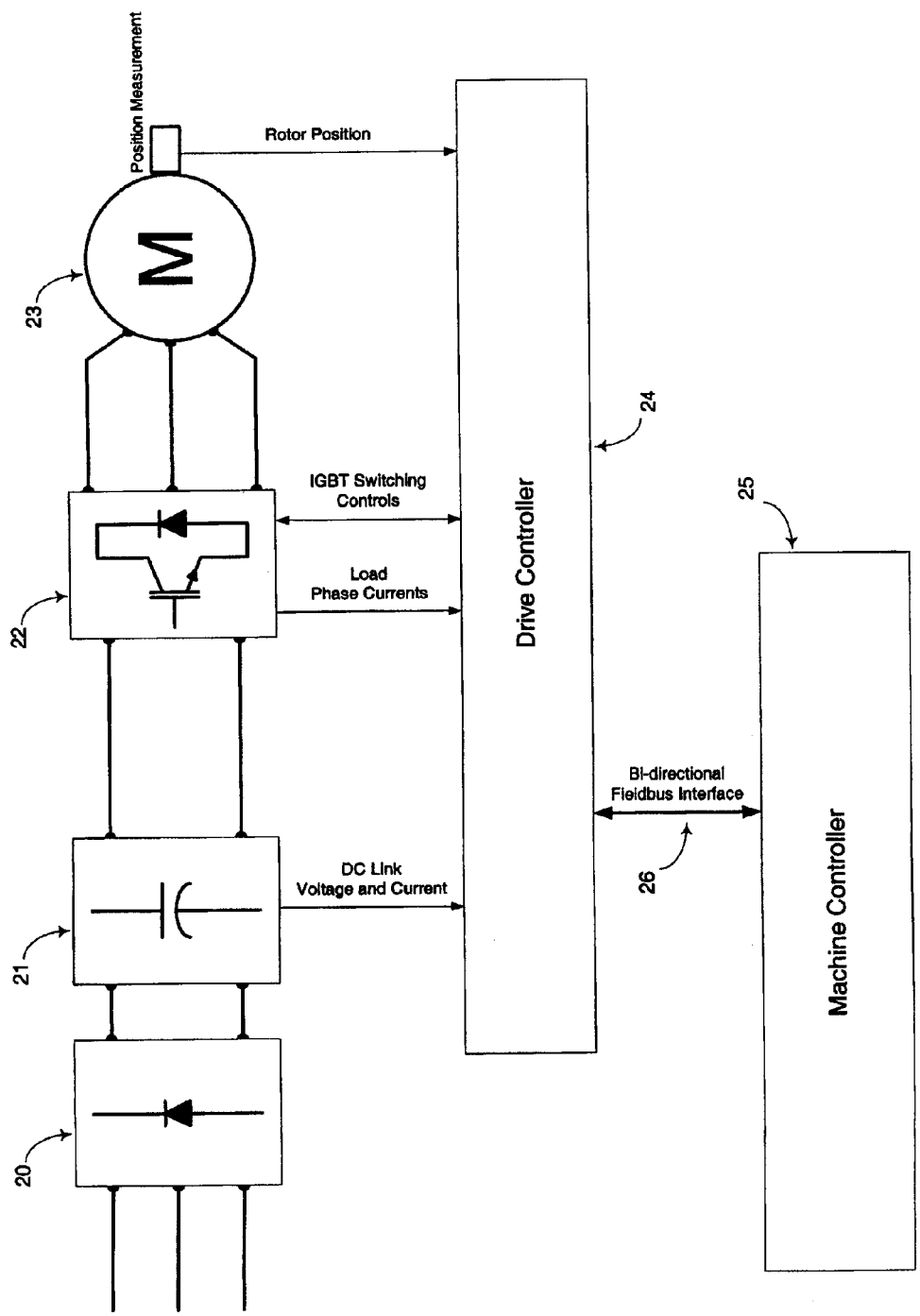
FIG. 2 is a simplified representation showing how a known VSI functions in an injection molding system.

The inverter 15 in the third section inverts the DC voltage from the DC link 11 to three-phase power at variable voltages and frequencies under the control of a drive controller 24 (shown in FIG. 2). The drive controller 24 uses voltage measurements and load current measurements obtained through measuring devices in the drive unit to construct signals to control the switching of six Insulated Gate Bipolar Transistors (IGBT) 16 of the inverter. The state-of-the-art drive controller uses Current Regulated Pulse-Width Modulation (CRPWM) or Space Vector Modulation (SVM), performed at high speed (in microseconds), to generate the three-phase output voltages and frequencies through switching of the six IGBTs 16.

Corresponding to each IGBT 16 of the inverter 15, there is a diode 17, which functions as the path for transferring regenerated power of the motor back to the DC link 11. The DC link 11 has only limited energy storage capacity. When rapid deceleration or load change is required of the motor, a braking resistor (not shown) is typically needed to protect the drive from the power surges. This braking resistor dissipates energy at the DC link 11 in the form of heat to keep the voltage of the DC link 11 from rising above the design limit. According to the preferred embodiments of the present invention, the braking resistor (and its consequential waste of energy) may be eliminated, while still providing adequate protection for the drive unit.

FIG. 2 is a simplified representation showing how a known VSI functions in an injection molding system. The VSI drive unit is abstracted into three blocks: a converter 20; a DC link 21; and an inverter 22, for ease of illustration. Based on processes and operations of the injection molding system, a machine controller 25 determines the target speed and/or torque required of a motor 23. These requirements, in the form of commands, are sent to a drive controller 24 via a high-speed bi-directional fieldbus interface 26, operating on the order of Mbits per second. The drive controller 24 switches (in micro-seconds) the IGBTs in inverter 22 to produce the required voltages and currents for the motor 23, driving an electric axis, (such as a hydraulic pump motor, a extruder screw rotation motor, an ejector actuator, a clamp actuator, a clamp locking actuator, a mold stroke actuator, an injection actuator and an axis of product handler) of an injection molding machine system, in order to satisfy the speed and torque required by the machine controller 25. The switching controls are executed according to the patterns and timing sequences, established by the control algorithm (to be described below) installed in the drive controller 24.

The control algorithm takes commands from the machine controller 25 and uses the measured values of the DC link voltage, load phase currents, load phase voltages, and an optional rotor position of the motor 23, to compute the switching patterns and timing sequences of the IGBTs. The computation is based on one of the state-of-the-art motor control methods, such as: 1) scalar frequency control based on keeping voltage-to-frequency (V/Hz) ratio constant; 2) Direct FOC based on direct rotor position measurement; 3) Indirect FOC based on estimation of rotor position from speed measurement; 4) Sensorless FOC based on estimation of rotor position from speed calculated from current and voltage values of the motor; 5) DTC based on direct rotor position measurement; 6) DTC based on estimation of rotor position from speed measurement and 7) Sensorless DTC. See, for example: "Digital Signal Processing Solution for AC Induction Motor", Texas Instruments Application Note BPRA043, 1996; "Field Oriented Control of 3-Phase AC-Motors", Texas Instruments Application Note BPRA073, February 1998; "High performance Direct Torque Control Induction Motor Drive Utilising TMS320C31 Digital Signal Processor", Inter University DSP Solutions Challenge '99, Texas Instruments Apr. 22, 2000; "A Variable-Speed Sensorless Drive System for Switched Reluctance Motors", Texas Instruments Application report SPRA600—October 1999; "AC Induction Motor Control Using Constant V/Hz Principle and Space Vector PWM Technique with TMS320C240", Texas Instruments Application report SPRA284A, April 1998; "Sensorless Control with Kalman Filter on TMS320 Fixed-Point DSP", Texas Instruments BPRA057, July 1997; "The 3 (or more) faces of ac variable-speed drives", by Frank J. Bartos, Control Engineering Nov. 1, 2001; and "Sensorless AC Drives Fill Price/Performance Niche", by Frank J. Bartos, Control Engineering Mar. 1, 2001. All of these control methods are available with off-the-shelf VSI drives. The selection is primarily based on application requirements and economics.

3. A Preferred Embodiment

Figure 3:
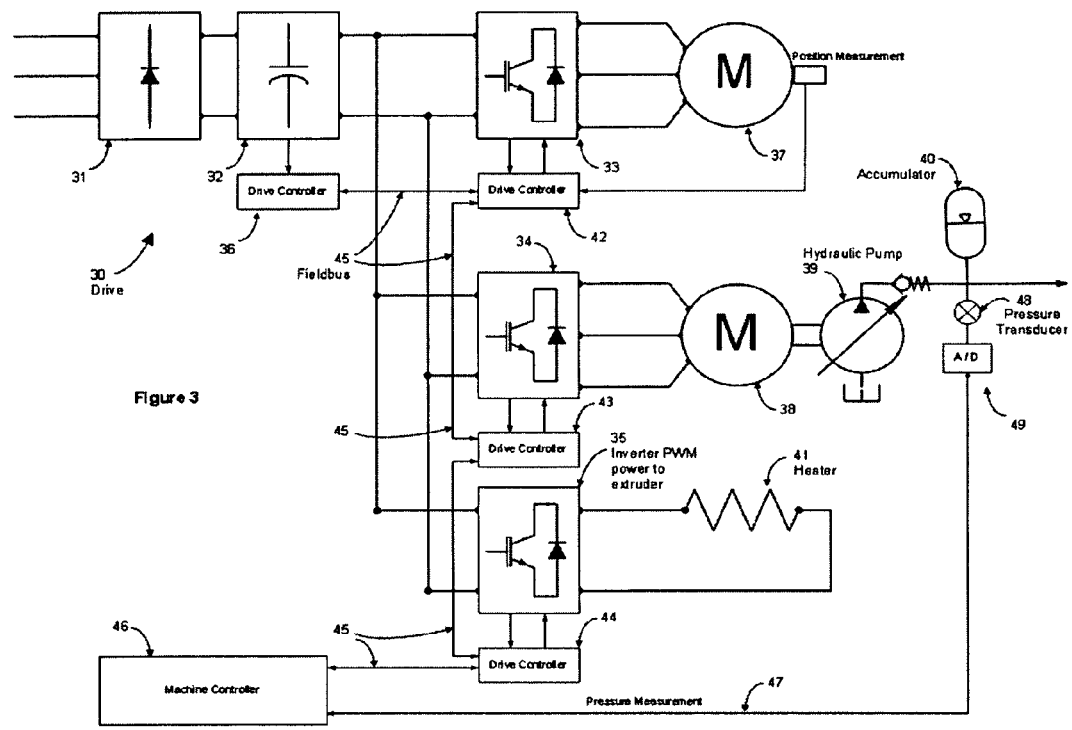
FIG. 3 is a schematic diagram of a preferred embodiment of the present invention.

FIG. 3 is an overall schematic of a preferred embodiment of the present invention. A drive 30 comprises a converter 31, a DC link 32, and multiple inverters 33, 34, and 35. The drive controller 36 monitors the actual supply current $I_{supply}$ (t) such as measured via current measurement 13 in FIG. 1, and the actual DC link voltage $V_{dc}(t)$, such as measured via voltage measurement 18 in FIG. 1. The inverter 33 provides AC supply to motor 37 that actuates a device on the machine. This circuit and its associated components form a typical drive for an actuator of an injection molding system, for both hybrid and all-electric types. A plurality of such devices may be installed in a hybrid injection molding system. The inverter 34 provides AC supply to an AC motor 38, which can be either an IM or SRM, which drives a variable or fixed displacement hydraulic pump 39, or a plurality of such pumps. The pump(s) supply pressurized oil to a circuit that includes an accumulator 40 and drives at least one hydraulic actuator (not shown) of the system. Optional inverter 35 provides Pulse-Width-Modulated (PWM) power to at least one extruder heater 41. Each inverter has its own drive controller 42, 43, and 44 respectively that monitors the DC supply voltage, actual load currents, actual load voltages, optional rotor's speed or position, and control the IGBT switching circuits to regulate the current to their respective devices.

All the drive controllers are preferably connected together with a high speed, bi-directional communication fieldbus (shown schematically at 45), having a cycle update time faster than 1 mS, which also connects them to the machine controller 46. Preferably, the machine controller 46 comprises one or more general-purpose computers with interface to the high speed bi-directional communication fieldbus 45. Of course, any type of controller or processor may be used in addition to or as a replacement of the one or more general-purpose computers. For example, Application Specific Integrated Circuits (ASICs), Digital Signal Processors (DSPs), gate arrays, analog circuits, dedicated digital and/or analog processors, hard-wired circuits, etc., may be used to perform the control functions described herein. Instructions for controlling the one or more of such controllers or processors may be stored in any desirable computer-readable medium and/or data structure, such as floppy diskettes, hard drives, CD-ROMs, DVD, RAMs, Flash RAMs storage, EEPROMs, magnetic media, optical media, magneto-optical media, or network connected storage, etc.

A hydraulic pressure transducer 48 measures the hydraulic pressure of the accumulator 40; its measurements are converted in real-time from analog form to digital form by A/D converter 49 before being transmitted to the computer 46 via a digital signal line 47. While signal line 47 can be of a direct digital interface of the computer 46 or a different fieldbus, it is preferred to be of the same high-speed bi-directional communication fieldbus 45.

When multiple drives of a hybrid or an all-electric injection molding machine share a common DC link 32 (as shown in FIG. 3), the change in storage energy of the DC link capacitor will be due to the power differences between the input power of the converter 31 $P_{con}(t)$ and the sum of the output powers of the inverters 33, 34, and 35

$$\sum_{i=1}^{n} P_{inv_i}(t),$$

where $P_{inv_i}(t)$ is the instantaneous power of the $i^{th}$ inverter at time t and n is the total number of inverters connected to DC link 32. $P_{inv_i}(t)$ can be calculated either from the measured currents and voltages of the inverter output, or from the current commands and the voltage commands of the inverter.

Ignoring the inherent switching and conducting losses of each component, the following equation can be used to describe the relationships between various powers at the DC link 32:

$$P_{con}(t) = V_{dc}(t) \cdot I_{supply}(t) = \sum_{i=1}^{n} P_{inv_i}(t) + C \cdot V_{dc}(t) \cdot \frac{\Delta V_{dc}(t)}{\Delta t} \quad (1)$$

Where C is the capacitance of the DC link capacitor; $V_{dc}(t)$ is the instantaneous voltage of the DC link 32; and $\Delta V_{dc}(t)$ is the change in DC link voltage in a short time interval $\Delta t$.

When the power is balanced at the DC link 32, the input power equals to the sum of all output powers, then the stored energy in the DC-link capacitor will not change, yielding no variation in the DC-link voltage, i.e. if $$P_{con}(t) = \sum_{i=1}^{n} P_{inv_i}(t) \text{ then } \frac{\Delta V_{dc}(t)}{\Delta t} = 0.$$

There are several conditions, which upset the power balance at the DC link 32:

Condition 1:

When $$\sum_{i=1}^{n} P_{inv_i}(t)$$

is negative and $V_{dc}(t)+\Delta V_{dc}(t)$ is higher than the design high voltage limit of the DC link $V_{dc\_MAX}(t)$. This condition occurs when regenerative power from the decelerating axes cannot be re-used by the other active axes and has exceeded power storage capacity of the DC link. Some means to remove such excess power is preferably used.

Condition 2:

When $$\sum_{i=1}^{n} P_{inv_i}(t)$$

exceeds the horsepower limit of the converter 31. The preferred embodiment takes advantage of the fact that not all axes are at their peak demands at the same time and this reduces the cost of installed components. Since there are multiple drives sharing a common converter 31, the total demands of all axes can exceed the horsepower limit of the converter 31. Some means to limit the demands to below the horsepower limit is preferably used.

Condition 3:

When source power supply experiences momentary voltage sag, which will consequently drive the DC link voltage $V_{dc}(t)$ below its design low voltage limit $V_{dc\_MIN}(t)$, due to discharge of DC link capacitor. This condition is due to the supply source. The consequence may cause a complete depletion of energy stored in the common DC link 32. Since control power of the drive controller may be supplied from the common DC link 32, it will result in a shutdown and prolonged start-up time due to the slow charging time of the common DC link 32. Therefore, it is desirable to provide some limited ride-through capability to maintain voltage of the common DC link 32 at an acceptable low level.

Condition 4:

When source power supply experiences momentary voltage surge, which will consequently raise the DC link voltage $V_{dc}(t)$ above its design high voltage limit $V_{dc\_MAX}(t)$. This condition is due to the supply source. Over-voltage can cause harm to the electronic components. The preferred means to alleviate the situation momentarily is to absorb as much power as possible without causing an adverse effect to the injection molding process.

An important feature is to drive one or more of the axes to provide and/or retrieve the exact amount of power to maintain a power balance at the DC link. In view of the above conditions, the preferred embodiment uses a slave axis (such as a hydraulic pump motor, or a high speed motor driving a mechanical flywheel), which has the following properties to maintain a power balance at the DC link 32:

1. The function of the axis is non critical to the injection molding process, i.e. change in speed or torque of the axis momentarily will have no adverse effect to the process;
2. The axis has a high inertia, which is capable of increasing its kinetic energy content to absorb power from DC link 32 and is capable of decreasing its kinetic energy content to regenerate power to the DC link 32;
3. The axis is capable of providing quick response to changes in command from the machine controller 46.

Figure 4:
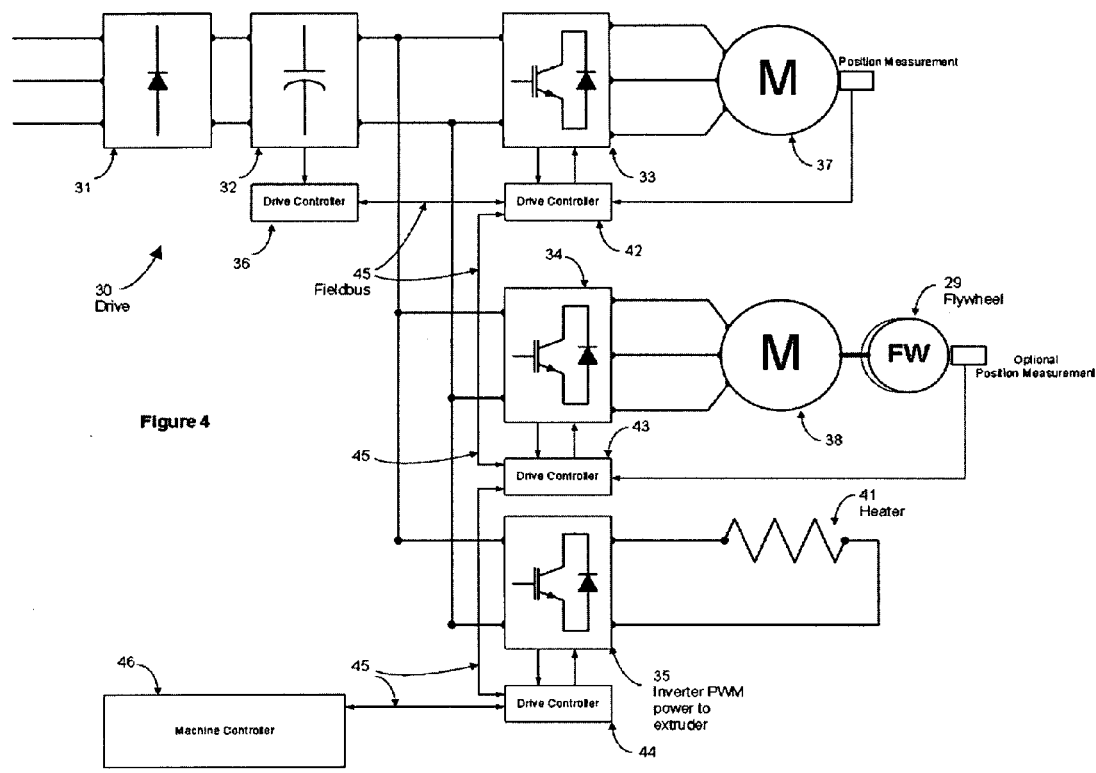
FIG. 4 is another schematic diagram of a preferred embodiment of the present invention.

An ASD driven pump motor axis supplying energy to a hydraulic accumulator, using the algorithm of FOC or DTC, is capable of fulfilling the functions of a slave axis in a hybrid injection molding system. For example, in FIG. 3, the motor 38 and accumulator 40 could function as the slave axis. In an all-electric injection molding system, an ASD driven motor, driving a mechanical flywheel, can be implemented to serve the same functions as a slave axis. For example, in FIG. 4, the motor 37 and flywheel 29 could function as the slave axis. Within the limits of process requirements, mold stroke actuator, clamping actuator, and certain other axes of part removal robots while performing non-critical tasks (those that do not work inside the mold area) can be used as the slave axis, as well. Any form of energy accumulator may be used, such as the hydraulic accumulator, the flywheel, a battery, a capacitor, an ultra capacitor, a carbon capacitor, a metal oxide capacitor, an active front end rectifier (AFE), a superconducting magnetic energy storage (SMES), a dynamic voltage restoration (DVR), a fuel cell, a motor and generator (M-G) set, and a mechanical over-hanging load.

Figure 5:
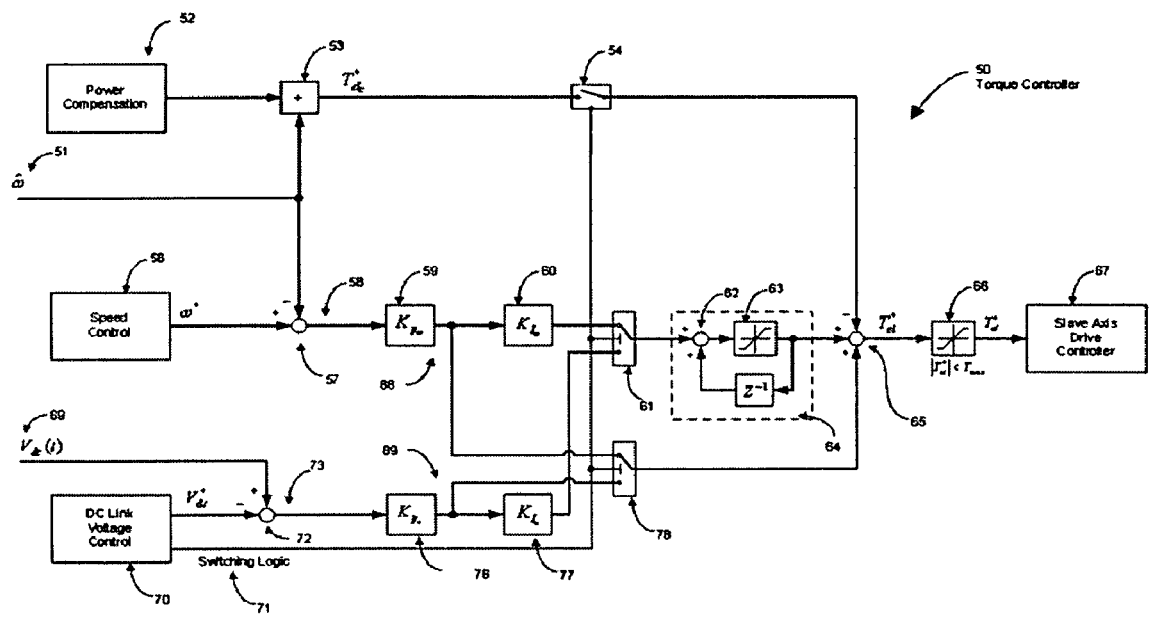
FIG. 5 is a schematic diagram of the control design for power balancing at a common DC link.

FIG. 5 depicts the control structure of a preferred embodiment of a torque controller 50 for the slave axis. The torque controller 50 may be embodied in machine controller 46 and/or any combination of the drive controllers 33, 34, and 35. In the preferred embodiment, under normal operating conditions, the speed controller 56 forms part of the machine controller 46. The speed controller 56 establishes the value of the speed command $\omega^*$ provided to the slave axis. A closed loop proportional and integral (PI) controller 88 (comprising a proportional gain 59 [in the form of an adjustable multiplier] and an integral gain 60), takes the difference 58 between the speed command and the feedback speed $\hat{\omega}$ 51. The feedback speed signal 51 is obtained from the slave axis drive controller 67 either by sensor measurement or by the different technique of an estimation based on a sensorless drive algorithm of the drive controller 67, to generate a torque command to the slave axis drive controller 67 via the high speed bi-direction communication fieldbus 45.

The torque controller 50 switches to DC link voltage control 70 from speed control 56, when any one of the abovementioned conditions (1–4) occurs. The DC link voltage control 70, which forms part of the machine controller 46, generates two command signals, namely a switching logic command 71 to switch control to another closed loop PI controller 89 (comprising proportional gain 76 and integral gain 77) and a feedforward compensation control via switches 78, 61, and 54, for generating a torque command to the slave axis drive controller 67 and the target DC link voltage $V_{dc}^*$ to the closed loop PI controller 89. The PI controller 89 takes the difference 73 between the target value $V_{dc}^*$ and the feedback DC link voltage $V_{dc}(t)$ to generate a torque command. The relationship between the DC link voltage and the torque is non-linear. The closed loop controller 89 can be a non-linear controller having variable gains, generated by a fuzzy controller or a look-up table means, to further enhance its performance.

The target DC link voltage $V_{dc}^*$ has a value within the boundaries of the $V_{dc\_MIN}(t)$ and the $V_{dc\_MAX}(t)$. The DC link voltage $V_{dc}(t)$ is normally permitted to change from the $V_{dc}^*$, within certain limits, to allow for residual harmonic ripple, fluctuation of the supply voltage, and the load-dependent voltage changes. The DC link voltage control 70 takes this into account to avoid undue torque transients or oscillations of the switching logic signal 71. When $V_{dc}(t)$ is less than $V_{dc}^*$, negative electromagnetic power is required of the slave axis to maintain the power balance at the DC link 32. By the same token, when $V_{dc}(t)$ is more than $V_{dc}^*$, positive electromagnetic power is absorbed by the slave axis to maintain the power balance at the DC link 32. Since a positive torque command to the slave axis will decrease the DC link voltage, therefore the sign of the voltage difference 73 in this loop is inverted.

To improve the dynamic behavior of the controller, feedforward compensation may be added. The principle of feedforward compensation is based on the steady state power balance at the common DC link 32 to establish a compensation power requirement to the slave axis. Measured values of the currents and voltages of all inverters, commanded values of the currents and voltages of all inverters, actual supply current $I_{supply}(t)$ and actual DC link voltage $V_{dc}(t)$, motor speeds (measured or estimated), are communicated by drive controllers 36, 42, 44 to the machine controller 46 via the high speed bi-directional communication fieldbus 45 in real-time. Therefore, the machine controller 46 has most of the information it needs to estimate a power requirement to the slave axis for maintaining power balance at the common DC link 32. One such calculation can be carried out as follows: For all $1 \leq i \leq n$ and $i \neq j$ (where j is the designated slave axis)

$$\text{Power Compensation} = \sum_{i=1}^{n} P_{inv_i}(t) - V_{dc}(t) \cdot I_{supply}(t) = T_{el_c}^* \cdot \hat{\omega} \quad (2)$$

Other calculations, such as incorporating lead filters to each power term in the above equation (2) to obviate delay times of the measurements could be carried out to improve exactness of the compensation for further performance enhancements. The output of the power compensation device 52 is then divided at 53 by the actual motor speed $\hat{\omega}$ 51 (either measured or estimated) of the slave axis to generate the feedforward torque compensation $T_{el_C}$*. The feedforward torque compensation $T_{el_C}$* is then subtracted at 65 from the torque command generated by the DC link voltage PI controller 89 to form the actual torque command provided to the slave axis drive controller 67.

As depicted in FIG. 5, the control structure of the torque controller 50 of the slave axis preferably has an integrator 64 with anti-windup function, formed by circuits 62 and 63, for both the speed control loop and the DC link voltage control loop. This control scheme provides a bumpless transfer during switching between control loops. In addition, a torque limiter $|T_{el}*|<T_{max}$ 66 is preferably implemented to avoid saturation of the torque control. It becomes apparent that the above described control scheme can provide the means to balance the power at the common DC link 32 in any of the abovementioned conditions (1–4).

Preferably, this embodiment provides additional means to address condition 2. When the machine controller 46 (based on the real-time information received from the high speed bi-directional communication fieldbus 45) detects that condition 2 is occurring, it sends appropriate speed and/or torque commands via the same communication fieldbus 45 to each active axis to reduce its power to a level such that the total output power of all active axes is within the horsepower limit of the converter 31.

During rapid deceleration of an electric motor driven actuator, the motor acts a generator, which converts the kinetic energy into electric energy. This electric energy is regenerated to the common DC link 32 where the drive of the pump motor is also connected. Driving the pump motor by an ASD and connecting it to the common DC link 32, establishes a simple conversion and transfer means to convert and divert any regenerated electrical energy to a hydraulic accumulator 40. Rather than dissipating this energy through braking resistors, which performs no useful work but increases heat to the environment, the machine controller 46 commands the drive of the pump motor to convert the energy into potential energy to be stored in the hydraulic accumulator 40 by increasing the flow rate of the pumping fluid, thereby preventing the DC link 32 from reaching its high voltage limit. By virtue of the hydraulic circuit, the fluid is pumped into the hydraulic accumulator 40 to increase its potential energy.

The pump motor drive command generated by the machine controller 46 is based on the object of maintaining a constant DC voltage at the common DC link 32. Pump motor 38 only has to charge the accumulator 40 occasionally, and the time of delivery of energy to storage is less critical, in an injection molding cycle. Some percentage of its energy regenerative capability can be used to provide ride-through (to sustain the operation of electrical drives during voltage interruption) to the common DC link 32 during voltage sag.

The preferred embodiment uses a control strategy, implemented in the machine controller 46, to manage the power balance at the common DC link 32 between all devices connected thereto. When regulation of the DC link voltage is required, it switches to a DC voltage control loop to generate torque commands to the ASD of a non-critical axis with high inertia load, such as the pump motor 38. The machine controller 46, together with the high speed fieldbus 45 connecting the system's sensors and actuators, has all the information required to make logic decisions for such switching according to status of the DC link 32. By this means, the cost of the braking resistors is eliminated, energy wasted in the form of heat is reduced, and deceleration energy is recovered into the energy storage device for reuse by other hydraulic actuations. Optionally, a portion of the barrel heaters 41 are connected to the common DC link 32 via solid state switching devices, serving the purpose of consuming the braking energy, to limit the DC link voltage. The machine controller 46 executes such control according to the sensed status of the DC link 32. Therefore, by use of either or both of the abovementioned methods of this embodiment, the need of braking resistors is eliminated and the braking energy can be reused for useful work rather than dissipated as heat to the environment.

In accordance with yet another feature of the preferred embodiment, the machine controller 46 generates control commands to the ASD of the pump motor 38 to regulate the flow rate based on the state of charge (SOC) of the hydraulic accumulator 40 and its rate of change. The ASD is preferably commanded by the machine controller 46 to run the pump motor 38 at a higher speed when SOC is low and to run the pump motor 38 at a lower speed when SOC is high. In addition, the machine controller 46 preferably takes the rate of change of the SOC into account to command the pump motor's speed for providing an appropriate charging rate.

The hydraulic accumulator 40 acting as an energy storage device will supply the stored energy to assist other hydraulic actuations for one or a plurality of other injection molding machine hydraulic actuators (not shown). This readily available power from the hydraulic accumulator 40, improves the response of the actuators from those actuated only by the pump 39. For a demanding process, such as thin wall plastic injection molding (which requires high flow rate to fill the mold), the machine controller 46 generates commands, based on the horsepower limit of the installed motor pump assembly, to drive the pump motor 38 at a speed higher than the speed driven by a normal fixed speed pump motor to achieve a higher injection speed. This increases the functional performance of the system, which would otherwise be limited by a normal fixed speed pump motor.

According to the preferred embodiment, multiple electric drives are connected to a common DC link 32 and they share a common converter. Since not all the drives are fully loaded at the same time, the converter section, which comprises a converter and a DC link 32, can be sized smaller than the sum of all the drives, when they are not commonly connected.

In addition, according to the preferred embodiment, the machine controller 46 continues to monitor and control: the horsepower limits of the installed drives and the common converter; and the DC voltage of the common DC link 32. Consequently, individual overload circuit protection for each drive is not required. The reduction in installed power by using a smaller size converter thus reduces the cost of the converter and the associated protection switchgear and cabling. The elimination of braking resistors also eliminates the protection casings and the cooling devices. The elimination of the motor starter for a fixed speed pump motor and reducing the individual overload protection for each drive to a single set of protection switchgear simplifies the system significantly and reduces component costs. All these cost reductions aggregate to greatly offset the additional cost of an ASD of the pump motor.

In accordance with another feature of the preferred embodiment, at least one heater 41 of the injection unit's heating assembly is connected to the common DC link 32 through an inverter, which supplies and regulates electrical power to the said heater for controlling the temperature of its related heating zone. This provides a means to reuse the regenerated energy during the braking or slow down of the commonly connected electric driven actuations.

Advantageous features according to the present invention include:
- Apparatus to regeneratively control a plurality of machine drives, and to an injection molding machine configured with such drives;
- An electric drive configuration that controls regenerated power from connected prime movers so as to minimize waste energy dissipation by switching regenerated power from some devices to other devices needing energy;
- The preferred embodiments may easily be embodied using:
  - At least one hydraulic axis actuator
  - At least one electric axis actuator
  - A common DC link
  - A machine controller
  - A fast acting bi-directional communication link, such as a fieldbus
  - A control algorithm
  - At least one hydraulic pump and accumulator wherein the pump can be one of: fixed displacement and variable displacement. Energy accumulator devices may also include one or more of heaters, flywheels, mechanical potential energy accumulators, batteries, capacitors, fuel cells, etc.
  - At least one hydraulic pump motor wherein the motor can be one of: an induction motor; a SRM; and a PMSM
  - At least one motor drive wherein the drive method can be one of: scalar frequency with constant voltage-to-frequency V/Hz ratio; direct, indirect or sensorless FOC; direct, indirect or sensorless DTC.

4. Conclusion

Thus, what has been described is a method and apparatus for the coupling of molding machine structures to provide economical and effective means to achieve higher energy efficiency for an injection molding system are needed.

The individual components shown in outline or designated by blocks in the attached Drawings are all well-known in the injection molding arts, and their specific construction and operation are not critical to the operation or best mode for carrying out the invention.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

All U.S. and foreign patent documents, all articles, brochures, and all other published documents discussed above are hereby incorporated by reference into the Detailed Description of the Preferred Embodiment.

What is claimed is:

1. Injection molding machine energy management control apparatus for controlling at least one of (i) a first electrically-driven prime mover configured to drive at least a first molding machine device, and (ii) a second electrically-driven prime mover configured to drive at least a second molding machine device, said control apparatus comprising:
   a common DC link configured to provide DC energy to the first electrically-driven prime mover and to the second electrically-driven prime mover;
   a slave axis configured to supply energy to and absorb energy from said common DC link;
   a non-electrical energy accumulation structure coupled to said slave axis and configured to supply energy to, and absorb energy from, said common DC link; and
   a machine controller configured to (i) communicate with the first electrically-driven prime mover, the second electrically-driven prime mover, said common DC link, and said slave axis, (ii) cause said slave axis to supply energy to said common DC link in response to input from at least one of the first electrically-driven prime mover and the second electrically-driven prime mover, and (iii) cause said slave axis to absorb energy from said common DC link in response to input from at least one of the first electrically-driven prime mover and the second electrically-driven prime mover.

2. Control apparatus according to claim 1, further comprising a high speed, bi-directional communication fieldbus configured to provide communication between said machine controller and said first electrically-driven prime mover, said second electrically-driven prime mover, said common DC link, and said slave axis.

3. Control apparatus according to claim 1, wherein said machine controller, in response to the input from at least one of the first electrically-driven prime mover and the second electrically-driven prime mover, generates command signals in real-time to cause said slave axis to supply and absorb energy to/from said common DC link.

4. Control apparatus according to claim 1, further comprising a torque controller configured to (i) control said slave axis in a normal speed control mode, and in a DC link voltage control mode, and (ii) switch between the two control modes in a bumpless transfer manner.

5. Control apparatus according to claim 1, further comprising the first electrically-driven prime mover, which is configured to drive a hydraulic pumping assembly, and wherein said machine controller is configured to regulate a flow rate and a pressure of a hydraulic fluid supply of the hydraulic pumping assembly.

6. Control apparatus according to claim 5, further comprising the second electrically-driven prime mover, which is configured to drive an electrically-driven actuator, and wherein said machine controller is configured to regulate current and voltage supplied to said the actuator.

7. Control apparatus according to claim 1, wherein said energy accumulation structure comprises mechanical energy accumulation device.

8. Control apparatus according to claim 7, wherein said mechanical energy accumulation device comprises a flywheel.

9. Control apparatus according to claim 1, wherein said energy accumulation structure comprises a hydraulic energy accumulation device configured to store and release energy through receipt and release of hydraulic fluid.

10. Control apparatus according to claim 9, further comprising a fixed displacement pump configured to supply hydraulic fluid to said hydraulic energy accumulation device.

11. Control apparatus according to claim 9, further comprising a variable displacement pump configured to supply hydraulic fluid to said hydraulic energy accumulation device.

12. Control apparatus according to claim 1, further comprising:
a first inverter configured to provide AC power to the first electrically-driven prime mover; and
a second inverter configured to provide AC power to the second electrically-driven prime mover;
wherein said common DC link is configured to provide DC energy to said first and second inverters.

13. Control apparatus according to claim 8, further comprising:
a first drive controller configured to provide adjustable speed drive to the first electrically-driven prime mover; and
a second drive controller configured to provide adjustable speed drive to the second electrically-driven prime mover;
wherein said machine controller is configured to control said first and second drive controllers.

14. Control apparatus according to claim 1, further comprising the first electrically-driven prime mover, and wherein said first electrically-driven prime mover comprises an induction motor.

15. Control apparatus according to claim 1, further comprising the first electrically-driven prime mover, and wherein said first electrically-driven prime mover comprises a permanent magnet synchronous motor.

16. Control apparatus according to claim 1, further comprising the first electrically-driven prime mover, and wherein said first electrically-driven prime mover comprises a switched reluctance motor.

17. Control apparatus according to claim 1, further comprising the first electrically-driven prime mover, and wherein said first electrically-driven prime mover comprises an adjustable speed drive, and wherein said machine controller controls said adjustable speed drive with field oriented control.

18. Control apparatus according to claim 1, further comprising the first electrically-driven prime mover, and wherein said first electrically-driven prime mover comprises an adjustable speed drive, and wherein said machine controller controls said adjustable speed drive with direct torque control.

19. Control apparatus according to claim 1, further comprising sensor structure configured to sense a rotor position of the first electrically-driven prime mover, and to provide the sensed rotor position to said machine controller.

20. Control apparatus according to claim 1, further comprising estimating structure configured to estimate a rotor position of the first electrically-driven prime mover, and to provide the estimated rotor position to said machine controller.

21. Control apparatus according to claim 1, further comprising:
a heater configured to absorb energy from said common DC link; and
an inverter, controlled by said machine controller, and configured to regulate electrical power to said heater to control the temperature of a corresponding heating zone.

22. An injection molding system control apparatus, comprising:
a first electrically-driven prime mover configured to drive at least a first molding machine device;
a second electrically-driven prime mover configured to drive at least a second molding machine device;
a common DC link configured to provide DC energy to said first electrically-driven prime mover and to said second electrically-driven prime mover;
a slave axis configured to supply and absorb energy from to/from said common DC link;
a non-electrical energy accumulation structure configured to supply energy to said common DC link, and to absorb energy from said common DC link; and
a machine controller configured to (i) communicate with said first electrically-driven prime mover, said second electrically-driven prime mover, said common DC link, and said slave axis, (ii) cause said slave axis to supply energy to said common DC link in response to input from at least one of said first electrically-driven prime mover and said second electrically-driven prime mover, and (iii) cause said slave axis to absorb energy from said common DC link in response to input from at least one of said first electrically-driven prime mover and said second electrically-driven prime mover.

23. Control apparatus according to claim 22, further comprising a high speed, bi-directional communication fieldbus configured to provide communication between said machine controller and said first electrically-driven prime mover, said second electrically-driven prime mover, said common DC link, and said slave axis.

24. Control apparatus according to claim 22, wherein said machine controller, in response to the input from at least one of the first electrically-driven prime mover and the second electrically-driven prime mover, generates command signals in real-time to cause said slave axis to supply and absorb energy from to/from said common DC link.

25. Control apparatus according to claim 22, further comprising a torque controller configured to (i) control said slave axis in a normal speed control mode, and in a DC link voltage control mode, and (ii) switch between the two control modes in a bumpless transfer manner.

26. Control apparatus according to claim 22, wherein said first electrically-driven prime mover is configured to drive a hydraulic pumping assembly, and wherein said machine controller is configured to regulate a flow rate and a pressure of a hydraulic fluid supply of the hydraulic pumping assembly.

27. Control apparatus according to claim 22, wherein said energy accumulation structure comprises mechanical energy accumulation device.

28. Control apparatus according to claim 27, wherein said mechanical energy accumulation structure comprises a flywheel.

29. Control apparatus according to claim 22, wherein said energy accumulation structure comprises a hydraulic energy accumulation device configured to store and release energy through receipt and release of hydraulic fluid.

30. Control apparatus according to claim 29, further comprising a fixed displacement pump configured to supply hydraulic fluid to said hydraulic energy accumulation structure.

31. Control apparatus according to claim 29, further comprising a variable displacement pump configured to supply hydraulic fluid to said hydraulic energy accumulation structure.

32. Control apparatus according to claim 22, further comprising:
a first inverter configured to provide AC power to said first electrically-driven prime mover; and
a second inverter configured to provide AC power to said second electrically-driven prime mover;

wherein said common DC link is configured to provide DC energy to said first and second inverters.

33. Control apparatus according to claim 32, further comprising:
a first drive controller configured to provide adjustable speed drive to said first electrically-driven prime mover; and
a second drive controller configured to provide adjustable speed drive to said second electrically-driven prime mover;
wherein said machine controller is configured to control said first and second drive controllers.

34. Control apparatus according to claim 22, wherein said first electrically-driven prime mover comprises an induction motor.

35. Control apparatus according to claim 22, wherein said first electrically-driven prime mover comprises a permanent magnet synchronous motor.

36. Control apparatus according to claim 22, wherein said first electrically-driven prime mover comprises a switched reluctance motor.

37. Control apparatus according to claim 22, wherein said first electrically-driven prime mover comprises an adjustable speed drive, and wherein said machine controller controls said adjustable speed drive with field oriented control.

38. Control apparatus according to claim 22, wherein said first electrically-driven prime mover comprises an adjustable speed drive, and wherein said machine controller controls said adjustable speed drive with direct torque control.

39. Control apparatus according to claim 22, further comprising sensor structure to sense a rotor position of said first electrically-driven prime mover, and to provide the sensed rotor position to said machine controller.

40. Control apparatus according to claim 22, further comprising estimating structure to estimate a rotor position of said first electrically-driven prime mover, and to provide the estimated rotor position to said machine controller.

41. Control apparatus according to claim 22, further comprising:
a heater configured to absorb energy from said common DC link; and
an inverter, controlled by said machine controller, and configured to regulate electrical power to said heater to control the temperature of a corresponding heating zone.

42. An injection molding system control apparatus, comprising:
a first electrically-driven prime mover configured to drive a hydraulic molding machine device;
a second electrically-driven prime mover configured to drive at least another molding machine device;
a common DC link configured to provide DC energy to said first electrically-driven prime mover and to said second electrically-driven prime mover;
a slave axis configured to supply and absorb energy from to/from said common DC link;
a machine controller configured to (i) communicate with said first electrically-driven prime mover, said second electrically-driven prime mover, said common DC link, and said slave axis, (ii) cause said slave axis to supply energy to said common DC link in response to input from at least one of said first electrically-driven prime mover and said second electrically-driven prime mover, and (iii) cause said slave axis to absorb energy from said common DC link in response to input from at least one of said first electrically-driven prime mover and said second electrically-driven prime mover; and
a hydraulic energy accumulation structure, coupled to said first electrically-driven prime mover, and configured to store and release energy through receipt and release of hydraulic fluid.

43. An injection molding system control apparatus, comprising:
a first electrically-driven prime mover configured to drive a mechanical molding machine device;
a second electrically-driven prime mover configured to drive at least another molding machine device;
a common DC link configured to provide DC energy to said first electrically-driven prime mover and to said second electrically-driven prime mover;
a slave axis configured to supply and absorb energy from to/from said common DC link;
a machine controller configured to (i) communicate with said first electrically-driven prime mover, said second electrically-driven prime mover, said common DC link, and said slave axis, (ii) cause said slave axis to supply energy to said common DC link in response to input from at least one of said first electrically-driven prime mover and said second electrically-driven prime mover, and (iii) cause said slave axis to absorb energy from said common DC link in response to input from at least one of said first electrically-driven prime mover and said second electrically-driven prime mover; and
a flywheel, coupled to said first electrically-driven prime mover, and configured to store and release energy through movement of said flywheel.

44. Energy management apparatus for a molding machine having (i) a first motor configured to drive a first molding machine device, and (ii) a second motor configured to drive a second molding machine device, said apparatus comprising:
an electrical link coupled to the first motor and to the second motor;
non-electrical energy storage structure configured to (i) store excess energy from at least one of the first motor and the second motor, and (ii) provide stored excess energy to at least one of the first molding machine device and the second molding machine device; and
processing structure configured to cause (i) excess energy from the first motor to be stored in said energy storage structure, and (ii) excess energy stored in said energy storage structure to be used to drive at least the first molding machine device.

45. Apparatus according to claim 44, wherein said processing structure causes excess energy stored in said energy storage structure to be transmitted to the second motor through said electrical link.

46. Apparatus according to claim 45, wherein said energy storage device comprises a flywheel coupled to the first motor, and wherein excess energy stored in said flywheel causes the first motor to generate excess electricity which is provided to said electrical link.

47. Apparatus according to claim 44, wherein the first molding machine device comprises a hydraulic device, and wherein said energy storage device comprises a hydraulic accumulator configured to store excess energy as a greater hydraulic pressure, and wherein said greater hydraulic pressure is used to drive the hydraulic device.

48. Apparatus according to claim 44, wherein said processing structure causes excess energy generated by the first motor to be supplied to the second motor, through said electrical link.

49. Apparatus according to claim 44, wherein said processing structure causes energy used by the first and second motors to be balanced at their respective lowest load requirements.

50. An injection molding machine, comprising:
a mold;
a mold clamp having a mold clamp actuator;
a mold screw having a mold screw actuator;
an electrical link coupling said mold clamp actuator and said mold screw actuator;
an non-electrical energy accumulator coupled to at least one of said mold clamp actuator and said mold screw actuator; and
energy management processing structure configured to cause (i) excess energy from at least one of said mold clamp actuator and said mold screw actuator to be stored in said energy accumulator, and (ii) energy stored in said energy accumulator to be provided to at least one of said mold clamp actuator and said mold screw actuator.

51. An injection molding machine according to claim 50, wherein said energy management structure causes the stored excess energy to be transmitted through said electrical link.

52. An injection molding machine according to claim 50, wherein said electrical link comprises a DC link, and further comprising a first inverter coupled to said mold clamp actuator, and a second inverter coupled to said mold screw actuator.

53. A method for managing energy in a molding machine having a first actuator for driving a first molding device and a second actuator for driving a second molding device, said method comprising the steps of:
receiving from the first actuator an input signal corresponding to the energy status of the first actuator;
receiving from the second actuator an input signal corresponding to the energy status of the second actuator;
calculating an excess energy condition of any of the first actuator and the second actuator based on the received input signals;
calculating an insufficient energy condition of any of the first actuator and the second actuator based on the received input signals;
based on the calculation, providing excess energy from at least one of the first actuator and the second actuator to an energy accumulation device; and
based on the calculation, providing excess energy from the energy accumulation device to at least one of the first actuator and the second actuator.

54. A method according to claim 53, wherein the step of providing excess energy from the energy accumulation device includes the step of providing the excess energy to at least one of the first actuator and the second actuator over a DC link.

55. A method according to claim 53, wherein the step of providing excess energy to the energy accumulation device includes the step of providing the excess energy to a hydraulic accumulator.

56. A method according to claim 53, wherein the step of providing excess energy from the energy accumulation device includes the step of providing the excess energy from a hydraulic accumulator.

57. A method according to claim 53, wherein the step of providing excess energy to the energy accumulation device includes the step of providing the excess energy to a flywheel.

58. A computer readable medium containing instructions which cause a processing structure in a molding machine that has (i) a first actuator for driving a first molding device and (ii) a second actuator for driving a second molding device, to perform the following steps:
receiving from the first actuator an input signal corresponding to the energy status of the first actuator;
receiving from the second actuator an input signal corresponding to the energy status of the second actuator;
calculating an excess energy condition of any of the first actuator and the second actuator based on the received input signals;
calculating an insufficient energy condition of any of the first actuator and the second actuator based on the received input signals;
based on the calculation, causing excess energy from at least one of the first actuator and the second actuator to be provided to an energy accumulation device; and
based on the calculation, causing excess energy from the energy accumulation device to be provided to at least one of the first actuator and the second actuator.

59. A method according to claim 53, wherein the step of providing excess energy from the energy accumulation device includes the step of providing the excess energy from a flywheel.

* * * * *